Figures 6, 7:
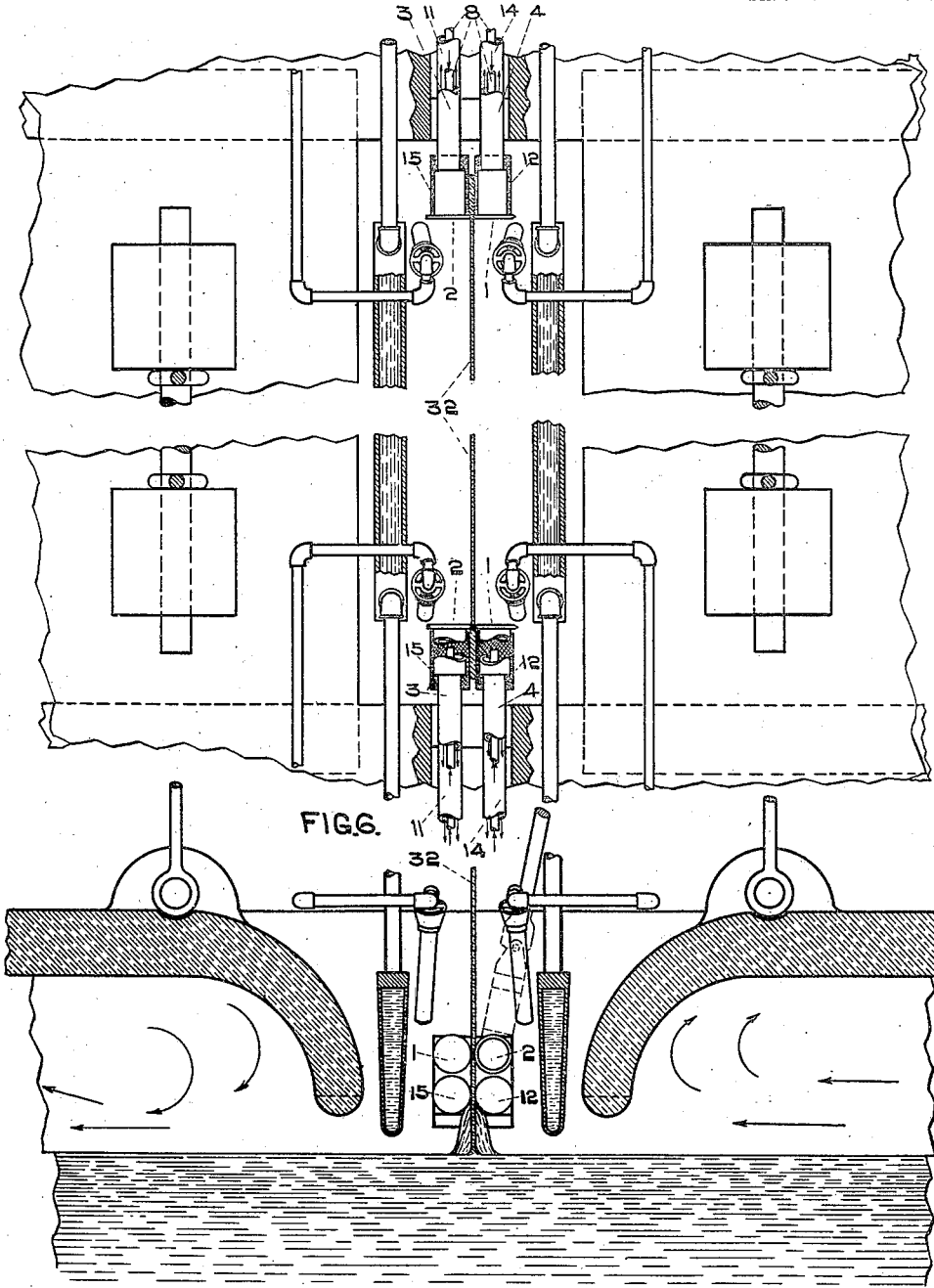

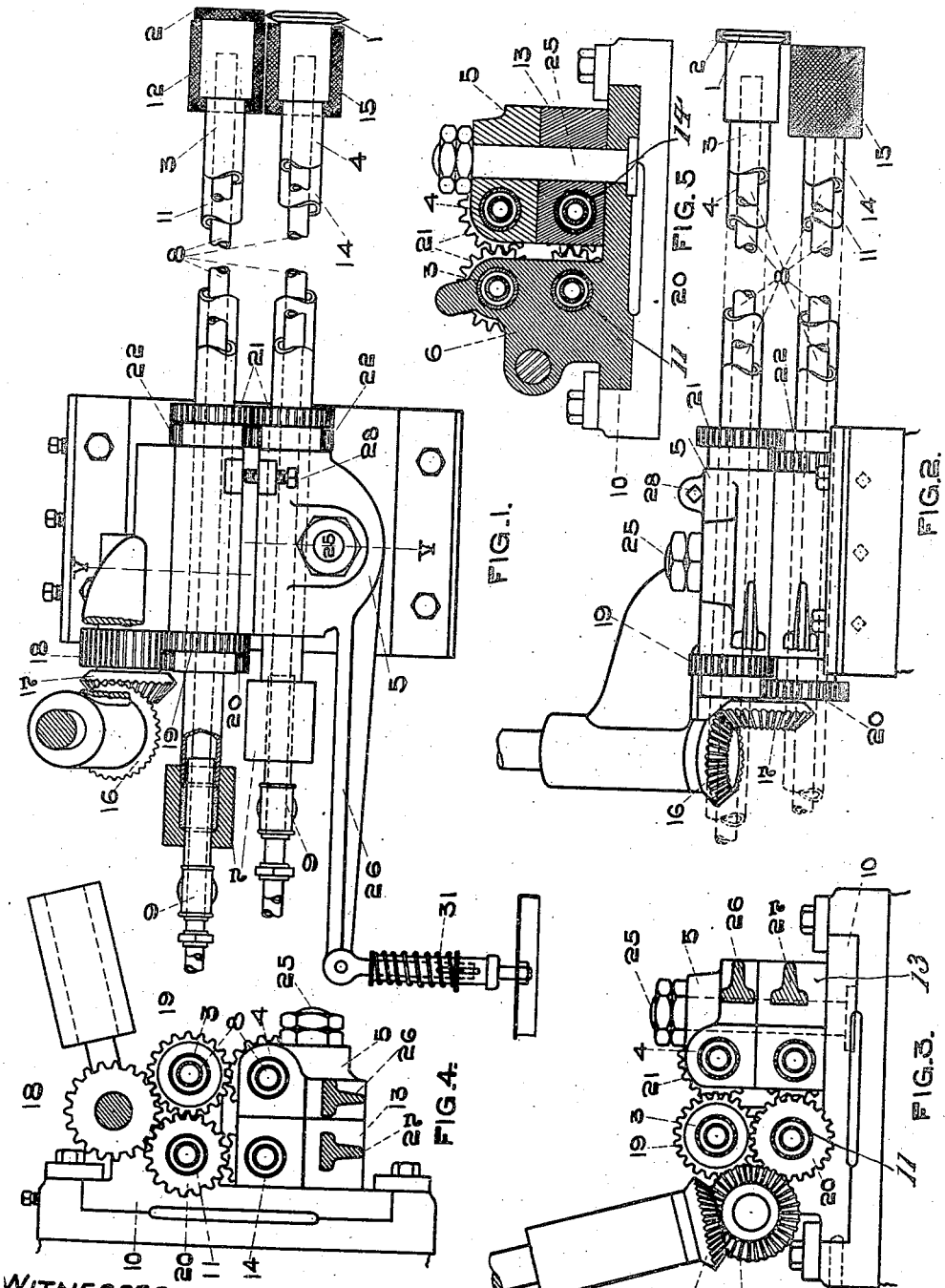

I. W. COLBURN.
SHEET GLASS DRAWING MACHINE.
APPLICATION FILED MAY 16, 1908.

1,122,692.

Patented Dec. 29, 1914.
6 SHEETS—SHEET 2.

WITNESSES

INVENTOR

BY HIS ATTORNEYS

I. W. COLBURN.
SHEET GLASS DRAWING MACHINE.
APPLICATION FILED MAY 16, 1908.

1,122,692.

Patented Dec. 29, 1914.
6 SHEETS—SHEET 5.

WITNESSES
INVENTOR

I. W. COLBURN.
SHEET GLASS DRAWING MACHINE.
APPLICATION FILED MAY 16, 1908.
1,122,692.
Patented Dec. 29, 1914.
6 SHEETS—SHEET 6.
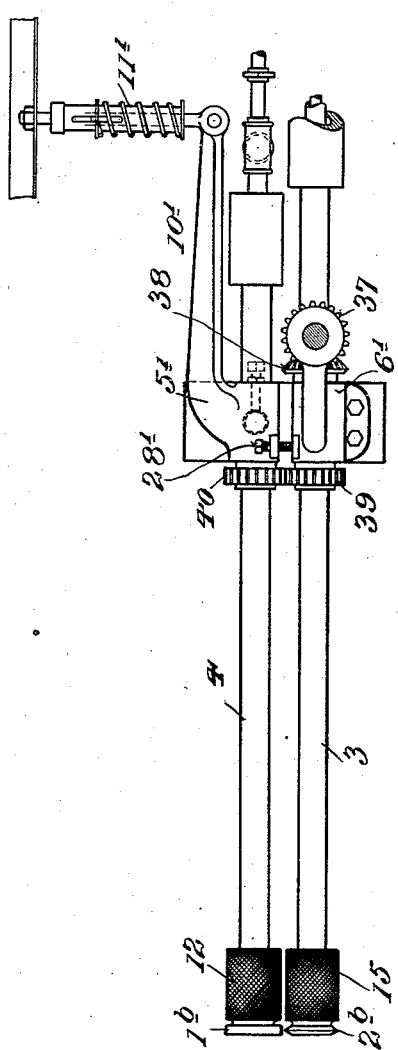
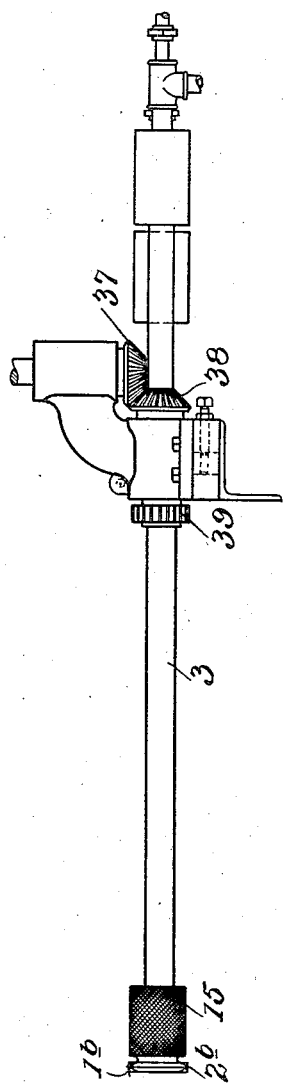

UNITED STATES PATENT OFFICE.

IRVING W. COLBURN, OF FRANKLIN, PENNSYLVANIA, ASSIGNOR, BY MESNE ASSIGNMENTS, TO TOLEDO GLASS COMPANY, OF TOLEDO, OHIO, A CORPORATION OF OHIO.

SHEET-GLASS-DRAWING MACHINE.

1,122,692.  Specification of Letters Patent.  Patented Dec. 29, 1914.

Application filed May 16, 1908. Serial No. 433,292.

*To all whom it may concern:*

Be it known that I, IRVING W. COLBURN, of Franklin, Pennsylvania, have invented a new and useful Improvement in Sheet-Glass-Drawing Machines, which improvement is fully set forth in the following specification.

This invention relates to the art of drawing sheet glass. In this art glass drawn in sheet form presents edges which it is necessary to trim off. The necessity for this trimming may arise from several causes, such as the fact that the edge portions do not form a straight line; that the sheet is of irregular thicknesses at the edge portions; or that the surface of the edge portion has been marred in the act of drawing the sheet, this latter marring effect being particularly noticeable when the sheet is drawn by apparatus such as that shown and described in my U. S. application Sr. No. 413296, filed Jan. 29th, 1908, and my U. S. Patent No. 970,182, dated Sept. 13th, 1910, in which the edges of the sheet are engaged by oppositely disposed rolls to assist in the drawing operation. Heretofore this trimming of the edges of the drawn sheet has been performed by a cutter on the cutting table after the sheet has been severed into sections and delivered from the machine. This involved an appreciable expense, since it consumed the time of a skilled operator, and the object of the present invention is to provide means in connection with the sheet glass drawing machine for automatically trimming the edges of the sheet, to the end that the sheet when delivered from the machine to the cutting table will be in condition to be cut into commercial sizes without the preliminary trimming of the edges thereof by the cutter.

With this object in view, the invention consists in the combination with sheet glass drawing apparatus, of means automatically scoring the sheet of glass as it is drawn and while still in a plastic condition, thereby establishing a line of fracture or cleavage which, under the strains established by the cooling and contraction of the sheet and the passing of the sheet over the bending roller of the machine, causes the edge portions of the sheet to be separated or severed therefrom along the line of fracture or cleavage thus secured.

Since the scoring devices act upon the edge portions of the sheet of glass when the same is in a plastic condition, and therefore heated to a high temperature, the scoring devices would become highly heated, and thus liable to stick to the plastic glass of the sheet unless means are provided for cooling the scoring devices, and to this end I provide means for circulating a cooling fluid, such as water, through the scoring apparatus, whereby the temperature of the scoring devices is maintained at a degree where it will not stick to the plastic glass.

My improved scoring device may be applied to a machine employing the edge-contacting rolls set forth in my above mentioned applications, and when so employed I may either construct and operate the scoring devices distinct from the edge-engaging rolls, so that the scoring device operates immediately after the rolls have performed their function, or I may so combine the scoring devices and the rolls into an unitary structure that the rolls and the scoring devices operate simultaneously.

The inventive idea involved is capable of receiving a variety of mechanical expressions, some of which, for the sake of illustration, are shown in the accompanying drawings, in which—

Figure 8:
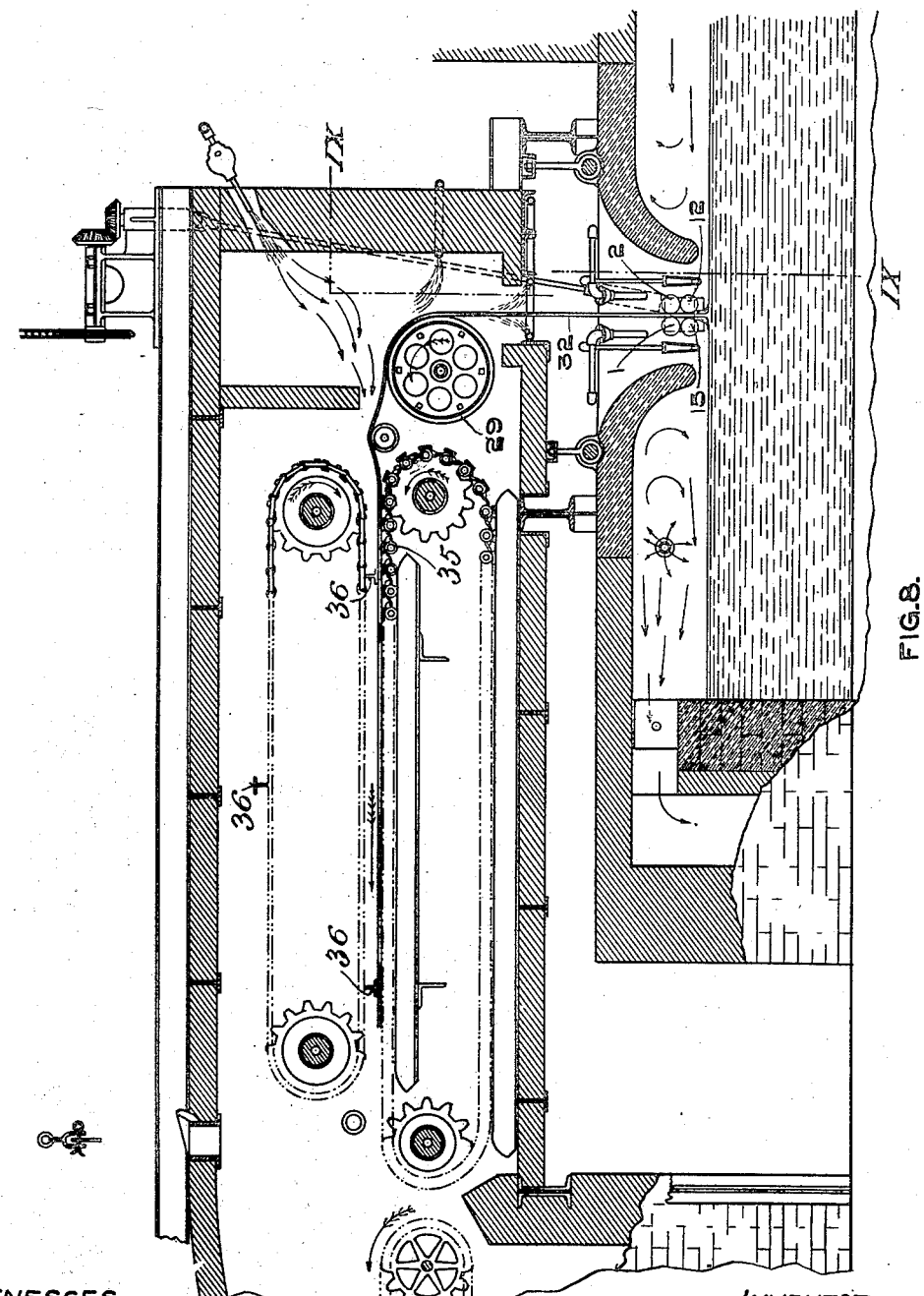
Figure 9:
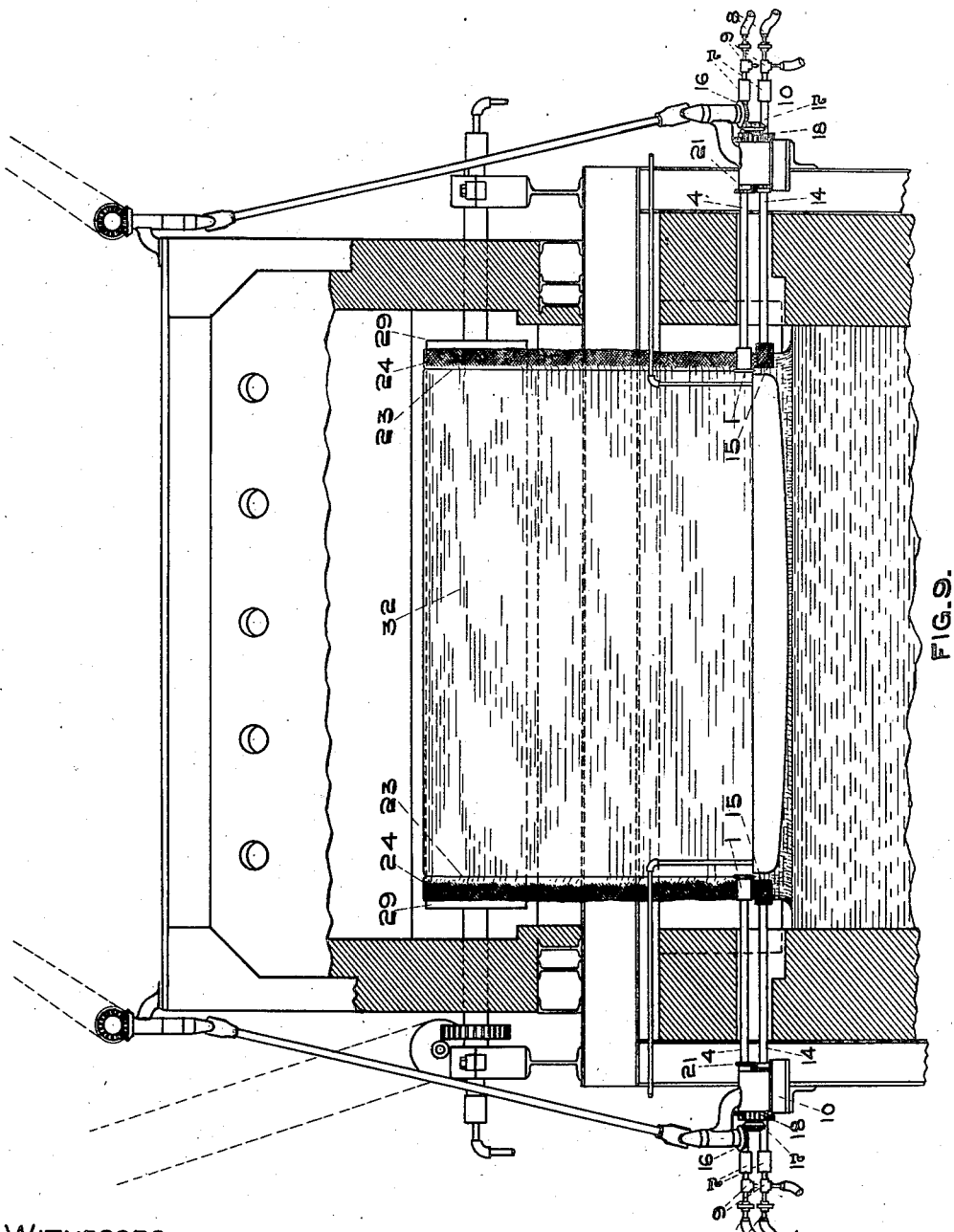

Figure 1 is a broken top plan view illustrating the invention; Fig. 2 is a side elevation of Fig. 1; Fig. 3 is an end view of Fig. 2 looking from the left; Fig. 4 is an end elevation of Fig. 1 looking from the left, with a portion of the gearing removed; Fig. 5 is a vertical sectional view on the line V—V of Fig. 1; Fig. 6 is a top plan view of the working chamber of a glass drawing machine with my invention applied thereto; Fig. 7 is a central vertical longitudinal section of Fig. 6; Fig. 8 is a central vertical longitudinal section of a glass drawing machine with my invention applied thereto; Fig. 9 is a transverse vertical section on the line IX—IX of Fig. 8; Figs. 10 to 22 inclusive illustrate some of the forms which my improved scoring device may assume; Fig. 23 is a top plan view showing my improved scoring device combined in a single structure with my improved side-holding rolls described in my aforesaid applications; and Fig. 24 is a side elevation of Fig. 23.

Referring to the drawings, in which like numerals indicate like parts throughout the several views, and turning first to Figs. 1 to 5 inclusive, 1 and 2 indicate two disks mounted respectively on hollow shafts 3 and 4, which pass revolubly in and are supported by bearings 6 and 5. At the rear end of the hollow shafts 3 and 4, stuffing boxes 7, 7, are provided, and through these stuffing boxes there are passed into the tubular shafts 3 and 4, pipes 8, 8, which pipes extend through the shafts and into the hollow hub portion of the disks. Any cooling medium, such as water, may be passed in through the pipes 8 to the hollow hub portion of the disks, and returns through the annular space between the pipes 8 and the shafts 3 and 4 to the outlets 9, 9, through which it is discharged. By this means the temperature of the disks may be readily regulated so as to secure the best results.

The bearing 6 is rigidly mounted upon a suitable base 10 (see Fig. 5), and receives not only the shaft 3 which carries the disk 2, but also the shaft 11 which carries the drawing roll 12. The bearing 5 which carries the shaft 4 for the disk 1 is so mounted as to be capable of a slight horizontally rotative movement, as is also the bearing 13 for the tubular shaft 14, which carries the drawing roll 15.

In my said application No. 413,296, I have described how the rolls 12 and 15 operate upon the edges of the sheet of glass to assist in drawing the same, and have also shown the means for operating or driving said rolls. The driving mechanism herein shown is a modification of that shown in said application, and is as follows:—Miter gear 16, driven from any suitable source of power, and preferably through the medium of a variable speed pulley, meshes with miter gear 17, upon the shaft of which there is secured the gear wheel 18. Gears 19 and 20 on the shafts 3 and 11 both engage the gear 18. Motion is transmitted from shaft 3 to shaft 4 by means of the intermeshing gears 21, 21, Fig. 1, and motion is transmitted from shaft 11 to shaft 14 through intermeshing gears 22, 22. Bearings 5 and 13 as above noted are mounted to oscillate around pin 25, to the end that the disk 1 and the roll 15 may be adjusted relatively to the disk 2 and the roll 12, the said disk 1 and roll 15, however, being normally held in close proximity to the disk 2 and the roll 12 by reason of the spring-actuated connection 31 attached respectively to the arms 26 and 27 extending rearwardly from the bearings 5 and 13. In order to determine the depth of the score line, the distance between the peripheries of the disks 1 and 2 is regulated by means of a set screw 28 passing through a screw-threaded lug in the bearing 25 and reacting against a part of the bearing 6 (see Fig. 1). By this means the inward movement of the bearing 5 under the influence of the spring connection 31 is limited or controlled.

Figure 10:
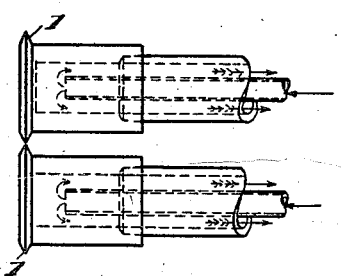
Figure 14:
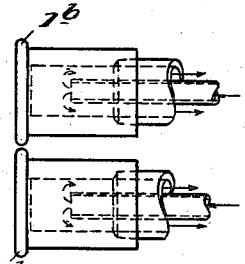
Figures 17, 18:
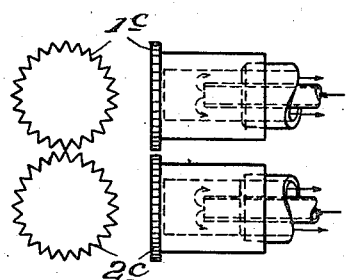
Figure 11:
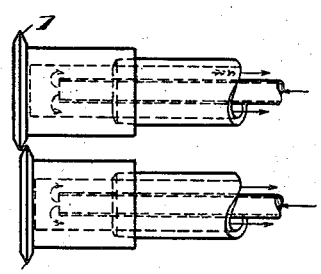
Figure 15:
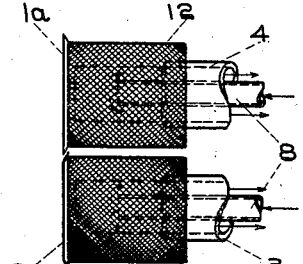
Figures 19, 20:
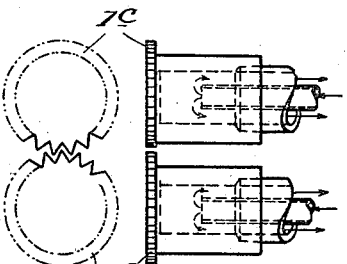
Figure 12:
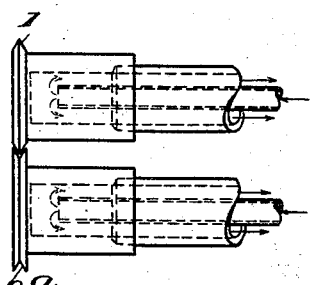
Figure 16:
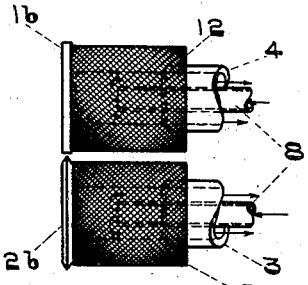
Figures 21, 22:
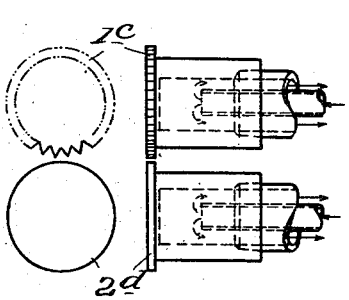
Figure 13:
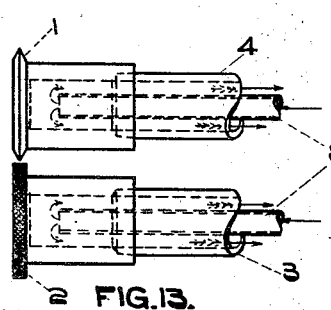

Referring to Figs. 10 to 22, I have there shown some of the forms which my improved sheet scoring device may assume. In Fig. 10 similar disks are placed with the corresponding portions of their peripheries immediately opposite each other, whereas in Fig. 11 the two disks are shown somewhat closer together than in Fig. 10, so that the cutting or scoring edges of the disks are not exactly oppositely disposed, but will act in different vertical planes. In Fig. 12 one of the disks (2$^a$) has a groove while the other has a knife-like ridge or edge on its periphery, which is so positioned as to partially enter the groove on the opposite disk, while in Fig. 13 one of the disks (2) is provided with a flat, knurled periphery oppositely disposed to a knife-like ridge or edge on the other disk. In Fig. 14 two oppositely disposed disks (1$^b$ and 2$^b$) with rounded edges are shown. In Fig. 15 there is illustrated the rolls 12 and 15 for assisting in the drawing of the edge portions of the sheet of glass, which rolls have secured to their inner extremities scoring or cutting disks 1$^a$, 2$^a$, which may be of any desired form, but as here shown are disks with reversely beveled edges placed in close juxtaposition. In this construction, where the scoring disks and the edge-drawing rolls are united in a single structure, but a single operating shaft for each roll and its combined disk is necessary, thereby dispensing with two of the operating shafts used when the form shown in Fig. 1 is employed. Fig. 16 shows a construction similar to Fig. 14, except that the disks differ somewhat in form. Figs. 17 and 18 illustrate forms of disks having serrated edges spaced far enough apart so that the serrations thereof do not intermesh, whereas in Figs. 19 and 20, similar disks (1$^c$ and 2$^c$) are illustrated placed close enough together for the intermeshing action to occur. In Figs. 21 and 22, one of the disks (1$^c$) is shown as having a serrated edge, whereas the other (2$^d$) has a plain periphery.

In Figs. 6 to 9 inclusive, I have shown my improved scoring device, combined with means for drawing sheet glass, wherein the glass is drawn in sheet form from the mass of molten glass in the working chamber and passed upward over a bending roll 29 and onto an endless carrier 35, where it is seized by grip bars 36 on an endless chain and thereby propelled through the closed chamber and into the leer 30. This portion of my drawing machine has been previously completely described in Patent No. 876,267, among others, and need not, therefore, be described herein. As clearly shown in these figures, the edge portions of the sheet of glass as it emerges from the mass of molten glass are seized between the two oppositely disposed pairs of side-holding rolls 12 and 15, which in the present instance being cross-hatched or corrugated or otherwise roughened, produce roughened edge portions 24, 24, on the sheet of glass 32. These rollers are mounted and driven substantially in the manner shown in my previous applications before mentioned. Mounted immediately above the rolls 12 and 15 and on opposite sides of the sheet of glass adjacent to each edge are the two disks 1 and 2, as will be clearly understood from an inspection of Figs. 7 and 9. The shafts bearing the disks 1 and 2 extend a little further inward than do the shafts bearing the rolls 12 and 15, so that the scoring disks act upon the sheet just inside of the roughened portions 24, 24, and by virtue of the scoring disks being near the surface of the molten material, act upon the sheet 32 while it is in a plastic condition, thereby scoring the lines 23, 23, just inside of the roughened portion 24, 24. As the sheet advances over the bending roll 29 and into the drawing chamber, the temperature of the sheet is lowered, and as it continues to advance from the drawing chamber into the leer the temperature being still further lowered, strains are set up in the sheet due to the contraction incident to the cooling action, and the roughened edges of the sheet are thereby caused to fracture or break away from the main sheet along the score lines 23, 23.

Referring to Figs. 23 and 24, there is therein shown a pair of width-maintaining and edge-drawing rolls 12 and 15, having on their extreme inner ends disks 1ᵇ, 2ᵇ, the construction of shafts, rolls and pipes for conducting the cooling fluid, and the form of disks being all substantially as shown in Fig. 16. These rolls are mounted on the shafts 3 and 4, which shafts are mounted in bearings 5', 6', the bearing 5' being so mounted as to be capable of a slight horizontally rotative movement, in order that the roll 12 and disk 1ᵇ may be withdrawn from or caused to approach the roll 15 and disk 2ᵇ as desired. A lever 10' is rigidly attached to the bearing 5' and projects rearward, and at the outer end of said lever is attached a spring connection 11', the normal action of which is to press the roll 12 and the disk 1ᵇ toward the roll 15 and disk 2ᵇ, the limitations on this action being established by the set screw 28' passing through a screw-threaded lug on the bearing 5' and abutting a part of the bearing 6'. The shaft 3 is driven by means of a miter gear 37 driven from any suitable source of power and meshing with miter gear 38 on the shaft 3, which shaft is connected to shaft 4 by spur gears 39 and 40 on the two shafts 3 and 4 respectively. It will be seen that by combining the side-holding rolls and the scoring disks in this manner, the general construction is much simplified.

By the use of the apparatus and devices above described, I am enabled to draw a sheet of glass of uniform width and simultaneously score the edge portions of the sheet to form lines of fracture or cleavage along which the undesirable edge portions will fracture or break away from the main sheet, to the end that the sheet of glass when it emerges from the leer will have straight clean-cut edges, leaving no work to be performed by the cutter on the cutting table other than cutting the glass into commercial sizes.

What is claimed is:—

1. In a sheet glass drawing machine, the combination of means for drawing a sheet of glass of uniform width, with a pair of shafts whose inner ends lie approximately adjacent to the opposite surfaces of the edge portions of the sheet, a scoring disk on the inner end of each of said shafts, yielding means normally holding said disks in operative relation with the sheet, and means for adjusting or regulating the limit of action of said yielding means.

2. In a sheet glass drawing machine, the combination with means for drawing a sheet of glass of uniform width, of a pair of shafts whose inner ends are adjacent to and on opposite sides of the edge portion of the sheet, a pair of edge-holding rolls on the inner ends of said shafts in position to engage the opposite surfaces of the edge portion of the sheet, and a pair of scoring disks on the inner ends of said rolls whereby the sheet of glass is scored longitudinally inside of the portion engaged by the rolls on said shafts.

3. In a sheet glass drawing machine, means for drawing a sheet of glass of uniform width, in combination with a rigid bearing, a shaft revolubly mounted in said bearing with its inner end adjacent to one surface of the edge portion of the sheet, a second shaft mounted on an oscillating bearing with its inner portion adjacent to the opposite surface of the edge portion of the sheet, and a scoring disk on the inner end of each of said shafts.

In testimony whereof I have signed this specification in the presence of two subscribing witnesses.

IRVING W. COLBURN.

Witnesses:
  E. R. INMAN,
  BESS LOUISE BLACK.